United States Patent
Hallgrimsson et al.

(10) Patent No.: US 6,651,994 B2
(45) Date of Patent: Nov. 25, 2003

(54) WALKER WITH MOVABLE CARRY BASKET

(75) Inventors: Bjarki Hallgrimsson, Ottawa (CA); Sarah Dobbin, Ottawa (CA); Douglas D. Macmillan, Ottawa (CA)

(73) Assignee: Randon Products Trust (BB)

( * ) Notice: Subject to any disclaimer, the term of this patent is extended or adjusted under 35 U.S.C. 154(b) by 0 days.

(21) Appl. No.: 09/908,091

(22) Filed: Jul. 18, 2001

(65) Prior Publication Data

US 2002/0079663 A1 Jun. 27, 2002

(51) Int. Cl.$^7$ ................................................. B62M 1/00
(52) U.S. Cl. ............... 280/87.041; 280/650; 280/87.05; 135/67; 297/6
(58) Field of Search ........................... 280/87.041, 642, 280/647, 650, DIG. 3, DIG. 4; 135/67; 482/68; 248/152, 153, 298.1; 297/5, 6, 183.6, 183.7, 183.9, 188.08, 188.11

(56) References Cited

U.S. PATENT DOCUMENTS

| | | | | |
|---|---|---|---|---|
| 4,907,794 A | * | 3/1990 | Rose | 135/67 |
| 5,170,810 A | * | 12/1992 | Chapin | 108/47 |
| D385,233 S | * | 10/1997 | Doyle et al. | D12/130 |
| 5,716,063 A | * | 2/1998 | Doyle et al. | 135/67 |
| 5,772,234 A | * | 6/1998 | Luo | 280/47.38 |
| D395,853 S | * | 7/1998 | Luo | D12/130 |
| 5,816,593 A | * | 10/1998 | Che | 280/641 |
| 5,887,887 A | * | 3/1999 | Keuning | 280/47.38 |
| 6,099,002 A | * | 8/2000 | Uchiyama | 135/67 |
| 6,139,046 A | | 10/2000 | Aalund et al. | |
| 6,318,392 B1 | * | 11/2001 | Chen | 135/66 |
| 6,494,469 B1 | * | 12/2002 | Hara et al. | 280/87.041 |

FOREIGN PATENT DOCUMENTS

CA 2170807 9/1996

OTHER PUBLICATIONS

SAMHALL (2 Page Brochure).
Samhall Plus (6 Page Brochure).
DOLOMITE (4 Page Brochure).
RAJOWALT—A Graham–Field Company (4 Page Brochure).
Topro Hilfsmittel (6 Page Brochure).
Evolution Walkers—Evolution Medical Products (4 Page Brochure).
The "Kombi 1" Mobile Transfer–Chair—Ahlbergs Mekaniska Verkst (20 Page Brochure).
Wheeled Walkers—Carters an Invacare Company (4 page Brochure).
Winnie Walker Company (4 Page Brochure).
Dana Douglas Medical Inc.(4 Page Brochure).
Dana Douglas Medical Inc. (4 Page Brochure).
ONO—Etac GmbH (2 Page Brochure).
Walkers from Etac—Etac GmbH (12 Page Brochure).
Walkerworks Manufacturing Inc. (4 Page Brochure).
Rollator—Reinhold Knochenmub (1 Page Brochure).
Uniroll (1 Page Brochure).
Mall Mobile—Select Medical Technology, Inc. (1 Page Brochure).
Sunrise Collection—Sopur Sunrise Medical (2 Page Brochure).
Kavelyteline Rolle—Satakunnan Tyke–Tuote Oy (1 page Brochure).

(List continued on next page.)

Primary Examiner—Brian L. Johnson
Assistant Examiner—Brian L Swenson
(74) Attorney, Agent, or Firm—Jon Carl Gealow

(57) ABSTRACT

A wheeled walker having a moveable carry basket. The walker has a carry basket mounted between the front leg members. The mounting arrangement permits the basket to be moved between a first position in which the basket projects forward of the front leg members for ease of loading and unloading and a second position in which the basket is displaced substantially rearward of the front leg members under the seating surface.

8 Claims, 5 Drawing Sheets

OTHER PUBLICATIONS

Noblemotion, Inc.—Nextstep Rolling Walker (2 Page Brochure).
Uniscan—Shoppers & Walkers (2 Page Brochure).
The Out–N–About—American Walker Inc. (2 Page Brochure).
Companion Walker—Companion Walker Ltd. (4 Page Brochure).
Hilfsmittel Fur Da Gehen (2 Page Brochure).
Oaao Bock (4 Page Brochure).
Tuffcare (4 Page Brochure).
Mobi—Ec–Bettensyteme (2 Page Brochure).
Liko—Liko InterCare AB (4 Page Brochure).
Jaeger's Rollator Series—Jaeger Indusrial Co., Ltd. (4 Page Broch.
Able Walker (2 Page Brochure).
Free Spirit—AMG Medical Inc. (2 Page Brochure).
Nova—Etac AB (4 Page Brochure).
Unicar Rollater Walker—Unicare Medical Products Inc. (2 Page Brochure).
Der Esla Rollator—E.S. Lahtinen Oy (1 Page Brochure).
Invacare—Invacare Corporation ( 4 Page Brochure).

* cited by examiner

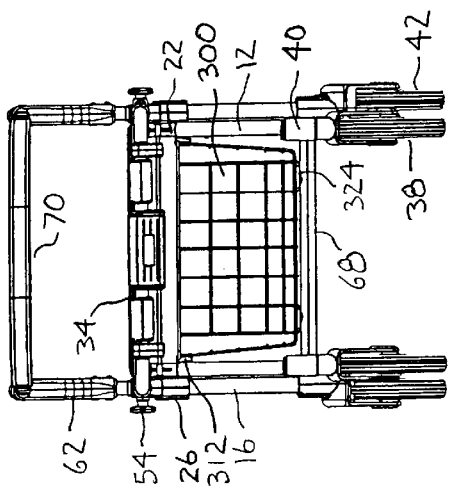
FIG. 5
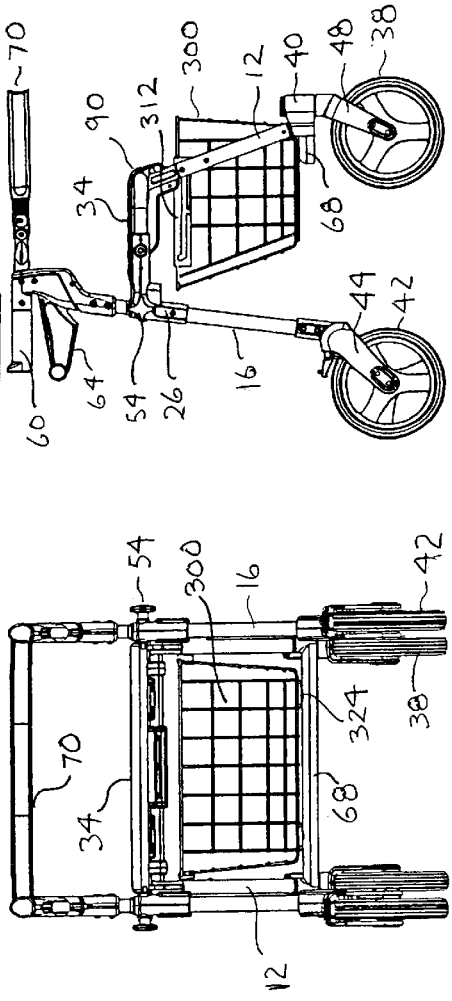
FIG. 3
FIG. 6
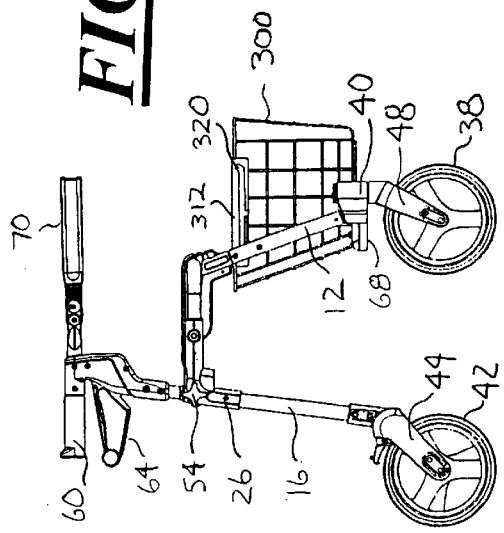
FIG. 7
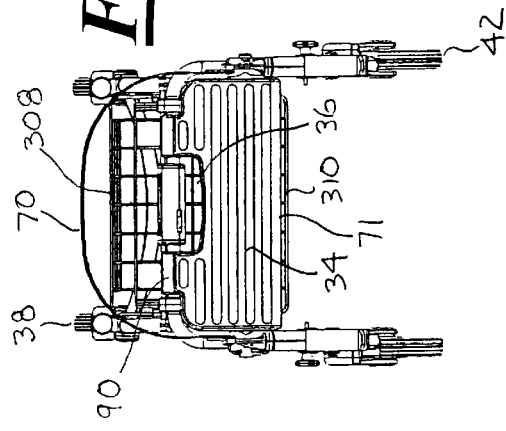
FIG. 4

WALKER WITH MOVABLE CARRY BASKET

BACKGROUND OF THE INVENTION

This invention relates to a wheeled walker equipped with a frame mounted carry basket. Many persons, by reason of age or disability have difficulty in walking without a walking aid. Wheeled walkers are widely used by many such persons to assist in mobility. A wheeled walker typically has a frame mounted on four wheels and a pair of rearwardly extending handle bars which the user can grip for support while walking. The user positions himself between the handle bars behind the walker and pushes the walker forward. The wheels permit the user to roll the walker smoothly over the ground thereby avoiding the laborious action of picking up and moving a non-wheeled walker in step-by-step fashion. The handle bars can be fitted with brake levers that when squeezed by the user, actuate some form of wheel braking mechanism. Wheeled walkers are routinely equipped with a seating surface that permits the user to rest in the sitting position. The seating surface is usually positioned transversely between the handle bars within the wheel base of the walker to offer a stable platform for sitting. In order to use the seating surface, the user must turn around and sit down in the rearward facing direction, opposite to the normal direction of travel, with his feet resting on the ground.

Conventional wheeled walkers are frequently equipped with carry baskets for transporting articles. This feature frees the user's hands for gripping the handle bars while the walker is being propelled and avoids the requirement to place articles on the user's lap while in the seated position. Carry baskets are conventionally mounted between the front frame or front leg members, usually between upper and lower cross-members that brace the leg members against collapse under load. This arrangement has a number of disadvantages.

The positioning of the basket substantially forward of the front leg members undesirably increases the overall length of the walker. This makes the walker difficult to manoeuvre in tight quarters and adversely affects stability, particularly when carrying a heavy load in the basket.

In the forward projecting position, the basket is difficult to access by a user when positioned behind the walker to propel it in the forward direction, as the user must reach forward over the seat to place items in the basket. This motion can be difficult for an elderly or infirm person.

The forward projecting basket position is also undesirable when the user is resting on the seat in the rearward facing position. In this position, the basket is completely out of view of the user. This can lead to a feeling of insecurity when articles such as a purse or other valuables are stored in the basket and cannot be easily monitored by the user.

Some conventional walkers have the carry-basket fixedly mounted under the seating surface such that it does not project substantially forward of the front leg members. Access to the basket is provided by flipping up the seat surface. This arrangement has the disadvantage that the basket cannot be accessed from the front of the walker. Furthermore, under-seat mounted baskets are usually removed from the walker by lifting through the opening when the seat is flipped to a vertical position. Thus, the basket must be limited in size in order to permit removal from the walker with such an arrangement.

There have been attempts to provide for a dual-position carry basket on a walker. One such walker provides a basket fitted with bidirectional hooks at its lower end to engage the lower cross-bar between the front leg members and which rests at it upper end against the upper cross bar. In order to move the basket from the forward facing to the rear facing position, the basket must be physically lifted off the lower cross member, turned around to the rearward facing direction and lowered back onto the lower cross bar. This manoeuvre can be difficult when the basket is full, particularly if the user is elderly or infirm. Furthermore, the nature of the bidirectional mounting inherently limits the size of the basket. In particular, the upper and lower front cross bars are longitudinally spaced due to the rake or angle of the front leg members and the basket must be sized to fit into this limited area.

In a conventional walker, the provision of a seat to permit the user to rest is a useful feature. However, it often occurs that the user is too tired to continue walking and requires the assistance of a care-giver to continue travel. Conventional wheeled walkers are not adapted to support a seated user and be pushed by a care-giver. In particular, because the user is seated in a rearward facing position between the handlebars, there is very little space between the user and the care-giver, making it difficult for the care-giver to take walking steps without interfering with the feet of the user. Moreover, the conventional fixed forward projecting basket position makes it impossible for the user to sit on the seating surface in the forward facing position to permit the walker to be propelled as a transport chair by a care-giver.

SUMMARY OF THE INVENTION

The present invention provides a carry basket arrangement for a wheeled walker that permits the walker to be used as a transport chair with the user in the forward facing position, permits the walker to be folded without removal of the basket and provides a basket of a desirably large size.

In accordance with the present invention, there is provided a wheeled walker comprising a pair of front and a pair of rear leg members each having a wheel rotatably mounted at the lower end thereof, a horizontal seating surface transversely disposed at the upper ends of said front and rear leg members and a pair of handle bar members projecting upwardly and rearwardly of said seating surface, said walker further comprising a carry basket disposed between said front leg members, said carry basket being mounted for reciprocal longitudinal movement between an extended position projecting forward of said front leg members and a retracted position substantially beneath said seating surface.

In accordance with another aspect of the present invention, the wheeled walker further includes a backrest moveable between a first position adapted to support a rearward facing seated user's back and a second position adapted to support a forward facing seated user's back and wherein said carry basket when in said retracted position does not interfere with the user's legs when in said forward facing seated position.

BRIEF DESCRIPTION OF THE DRAWINGS

FIG. 3 is a right side view of the walker/transport chair of the present invention with the carry basket in the retracted position;

FIG. 4 is a plan view of the walker/transport chair of the present invention with the carry basket in the retracted position;

FIG. 5 is a front view of the walker/transport chair of the present invention with the carry basket in the retracted position;

FIG. 6 is a rear view of the walker/transport chair of the present invention with the carry basket in the retracted position;

FIG. 7 is a right side view of the walker/transport chair of the present invention with the carry basket in the extended position;

DESCRIPTION OF THE PREFERRED EMBODIMENT

Figure 1:
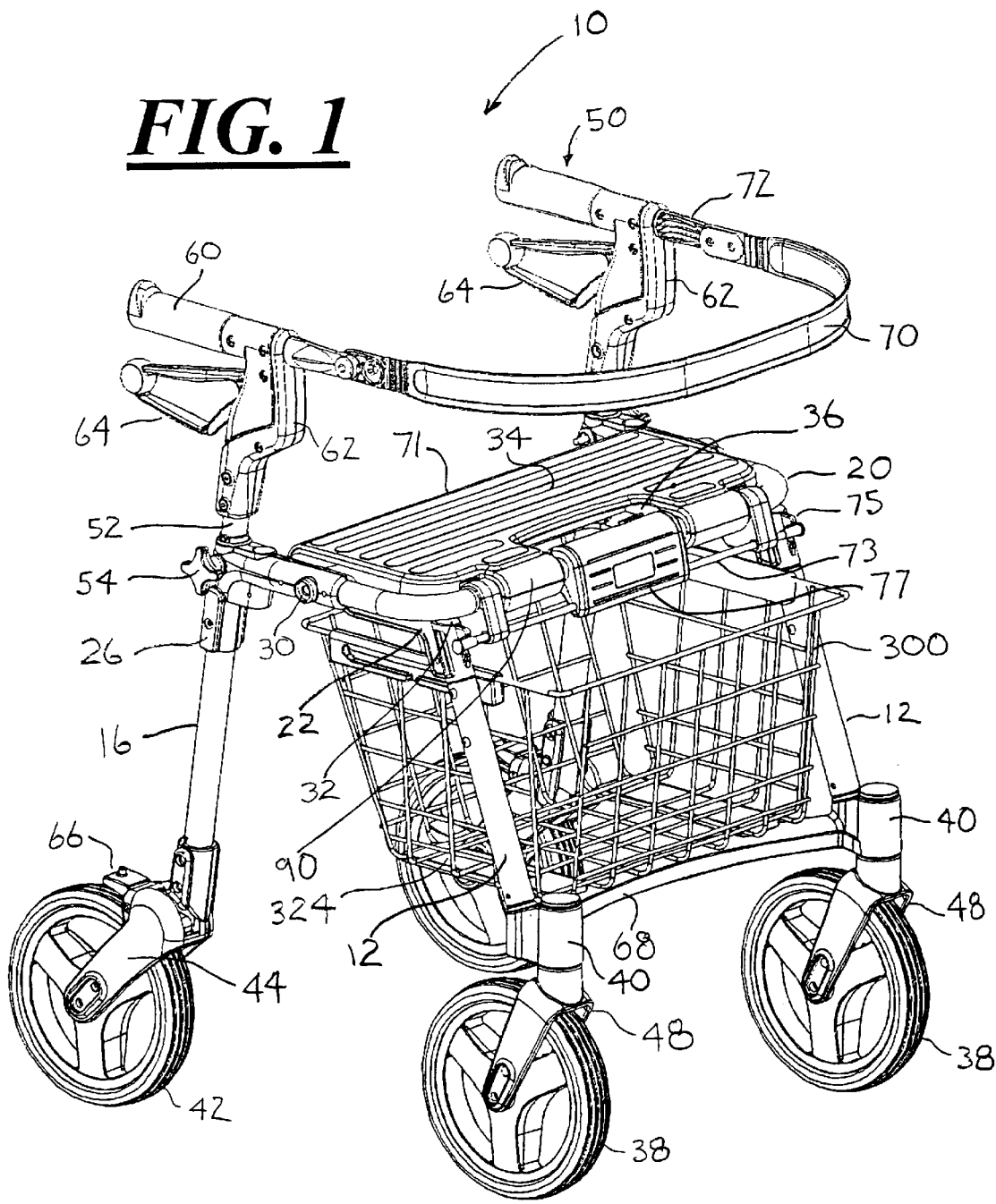
FIG. 1 is a front right perspective view of the walker/transport chair of the present invention shown with the carry basket.

Referring to FIGS. 1 to 7, there is shown a perspective view of walker/transport chair 10 in the walker configuration. The carry basket has been omitted from FIG. 2 in order to more clearly show the carry basket mounting arrangement as described below.

Walker/transport chair 10 has a pair of forward leg members 12, a pair or rearward leg members 16, and a U-shaped transverse seat support member 20. Front leg members 12 are fixedly secured at their upper ends to front leg brackets 22 and rear leg members 16 are fixedly attached at their upper ends to rear leg brackets 26. Front leg brackets 22 are pivotally attached to rear leg brackets 26 at pivot pins 30. In the open or operative position shown in FIGS. 1 to 7, abutment surfaces 32 at the upper ends of front leg brackets 22 engage the forward lower edge of seat support member 20 when forward leg members 12 are in the open and weight bearing position. Front leg brackets 22 permit the front leg members 12 to be folded toward rear leg members 16 in order to collapse walker/transport chair 10 into a more compact configuration, for example for placement in the trunk of a car.

Walker/transport chair 10 is locked in the open position by means of lock rod 73 which engages projections 75 on front leg brackets 22. Handle 77 is rotatably mounted about transverse seat support member 20 for moving lock rod 73 out of engagement with projections 75. Handle opening 36 is provided in seating surface 34 to provide easy access to handle 77.

Seating surface 34 is horizontally supported at its forward edge 90 by transverse seat support member 20 and provides a stable seating platform. Seating surface 34 is pivotally attached to transverse seat support member 20 such that it can be flipped to a vertical position by pulling up on rear edge 71. This position is particularly useful when the user wishes to move as far forward as possible, for example when reaching ahead of the walker/transport chair to remove objects from a cupboard. This position also permits easy access to basket 300 when it is in the retracted position as described in further detail below.

Front leg members 12 are stabilized by cross-bar member 68 which extends horizontally between front leg members 12 and is fixedly secured to the bottom ends of front leg members 12 at end fittings 40. Front wheels 38 are mounted on front fork assemblies having a vertical axle shaft carried in a bearing assembly (not shown) in each end fitting 40 for rotation about the vertical axis to permit front wheels 38 to caster for ease of steering walker/transport chair 10.

Rear wheels 42 are carried at the lower ends of rear leg members 16 on rear fork assemblies 44. Rear fork assemblies 44 are fixedly connected to the lower ends of rear leg members 16.

Push handle assemblies 50 are fixedly attached to the upper ends of telescopic tubes 52 which are slidably received in rear leg members 16. The height of push handle assemblies 50 can be adjusted by extending or retracting telescopic tubes 52 in rear leg members 16. Telescopic tubes 52 have a series of through holes at uniform spacings along their length through which thumb screws 54 can be selectively inserted to fix push handle assemblies 50 at the desired height.

Push handle assemblies 50 comprise handgrips 60, handle housings 62 and brake levers 64. Brake levers 64 are operatively connected to brake shoes 66 by length adjustable rod assemblies housed within telescopic tubes 52 and rear leg members 16. Movement of brake levers 64 will cause brake shoes 66 to move into braking engagement with the tread of rear wheels 42 thereby arresting rolling motion.

When walker/transport chair 10 is in the walker configuration as shown in FIGS. 1 to 7, the user positions himself behind walker/transport chair 10, and between push handle assemblies 50 facing the forward direction. In order to function as an effective walker, it is desirable that the geometry of the walker be such that the user can position himself far enough forward that his centre of gravity is vertically aligned over handgrips 60. This will permit the user to support a substantial portion of his weight on handgrips 60 when desirable to reduce the weight on the feet. In order to ensure stability of the walker when a substantial vertical load is placed on handgrips 60, the handgrips must be positioned forward of the point of ground contact of rear wheels 42. Moreover, in order to facilitate walking, there must be sufficient room in front of the user to permit him to extend his feet forward in a natural walking gait without interfering with the walker structure, and in particular with the seating surface. Accordingly, the position of seating surface 34 is biased to the front of walker/transport chair 10 such that its rear edge 71 is forward of handgrips 60. In addition, seating surface 34 can be flipped to a vertical position about transverse seat support member 20 as described above. This will provide the user with additional space to move forward between push handle assemblies 50 if desired.

When the user wishes to rest, he simply turns around between push handle assemblies 50, using handgrips 60 for support if required, and sits down on seating surface 34, with his feet on the ground. Backrest 70 is provided to support the user's back while seated on walker/transport chair 10. Backrest 70 is attached to extension arms 72 which are fixed at their rearward ends to push handle assemblies 50.

Backrest 70 is formed of a flexible plastic material and has sufficient flexibility in the central back-supporting area to conform to and support a user's back. In the alternative, backrest 70 can be formed of a rigid material such as aluminum if a non-flexible backstrap type backrest is desired. Backrest 70 can be manually flipped from the forwardly extending position shown in FIGS. 1 to 7 for use in the walker mode, to the rearwardly facing position, shown in FIG. 8 for use in the transport chair mode.

When walker/transport chair 10 is in the transport chair configuration, the user or a caregiver flips backrest 70 to the rearward extending position as shown in FIG. 4. The user positions himself in front of and facing away from walker/transport chair 10 and sits down on seating surface 34 with his back against backrest 70 and in that position can be comfortably propelled by the care-giver in the transport chair mode. The forward facing seated position is not only useful when the apparatus is being propelled by a care-giver in the transport chair mode, but also permits the apparatus to be positioned close to a table, for example when eating a meal. Conventional walkers in which the user is seated in the rearward facing position are not well suited to this application because the rearward projecting handgrips and the rear wheels limit how close the walker can be placed, while the seating surface is typically positioned far forward of the handgrips.

Conventional walkers usually require a cross-bar between the front leg members to strengthen the frame against collapse when the walker is bearing substantial weight, for example, when the user is seated. A front cross-bar is particularly required where the front leg members are pivotally attached to the frame to permit folding, which pivotal attachment provides little resistance to outward splaying of the legs under load.

For conventional walkers, the presence of a cross-bar between the front legs of the walker typically does not interfere with the user's movements, as the user is positioned behind the walker in both the walking and sitting positions. However, the front cross-bar on a conventional walker interferes with its use as a transport chair. In particular, in order to assume the forward facing sitting position in the transport chair mode, a user must be able to position his heels very close to a point on the ground directly under the front edge of the seating surface. If the user is positioned too far forwards, he tends to lose balance when attempting to assume the seated position, falling backward in an uncontrolled manner onto the seating surface. This can cause the walker to upset resulting in serious injury to the user. Conventional cross-bars are usually positioned well forward of the front edge of the seating surface and accordingly tend to prevent a user from positioning his heels close to a point on the ground directly under the front edge of seating surface.

The walker/transport chair design of the present invention is configured to overcome the limitations of conventional walker frame design. First, as seen in FIG. 1, front leg members 12 are positioned at an angle closer to vertical than are most conventional walkers. This minimizes the extent to which the lower ends of front leg members 12, and consequently cross-bar 68, project forward of the forward edge 90 of seating surface 34. However, this has the undesirable effect of shortening the wheelbase and lessening stability. In order to provide for a lengthened wheelbase, the front fork assemblies 48 are not secured axially inside the lower end of front legs 12 as is conventional practice in walker design. Instead, front fork assemblies 48 are secured in end fittings 40 which project forwardly from the lower end of leg members 12, effectively lengthening the wheelbase.

Another feature of the present invention that enhances its use as a transport chair is the design of cross-bar 68. Cross-bar 68 attaches to front leg members 12 at their lower ends, which point is forward of the forward edge 90 of seating surface 34. In order to permit the user to more safely assume the forward-facing seated transport chair position, cross-bar 68 is rearwardly curved such that its central portion is located substantially under the forward edge 90 of seating surface 34. This curved cross-bar arrangement permits the user to place his heels close to a point on the ground directly under the front edge of seating surface. While a curved geometry is shown in the drawings, other configurations could be used so long as the cross-bar is configured such that its central portion is located substantially under or behind the forward edge 90 of seating surface 34.

Referring now to FIGS. 9 to 12. Basket 300 is formed of a wire-cage type construction and has bottom panel 302, generally vertical side panels 304 and 306, substantially vertical front panel 308 and inclined rear panel 310. Basket 300 is open at its upper end to permit articles to be placed into basket 300 onto bottom panel 302.

The upper edges of side panels 304 and 306 are fitted with rail members 312. Rail members 312 are formed of plastic or other suitable material in an inverted "U" shape and are fitted over and extend down either side of the upper edge of side panels 304 and 306. The rail members can be secured to the wire-cage construction by through bolts, clips or other suitable fastening means. In the alternative, rail members 312 can be integrally formed with basket 300. Grooves 316 are formed along the length of the outer facing surfaces of rail members 312. Grooves 316 have upward projecting detents 320 and 322 formed at either end and mounting notches 323.

Slide members 324 are fixed to the downward facing surface of bottom panel 302. Slide members 324 can be formed of the same material as rail members 312. Detents 325 and 326 comprise shallow circular depressions at each end of slide members 324.

Figure 2:
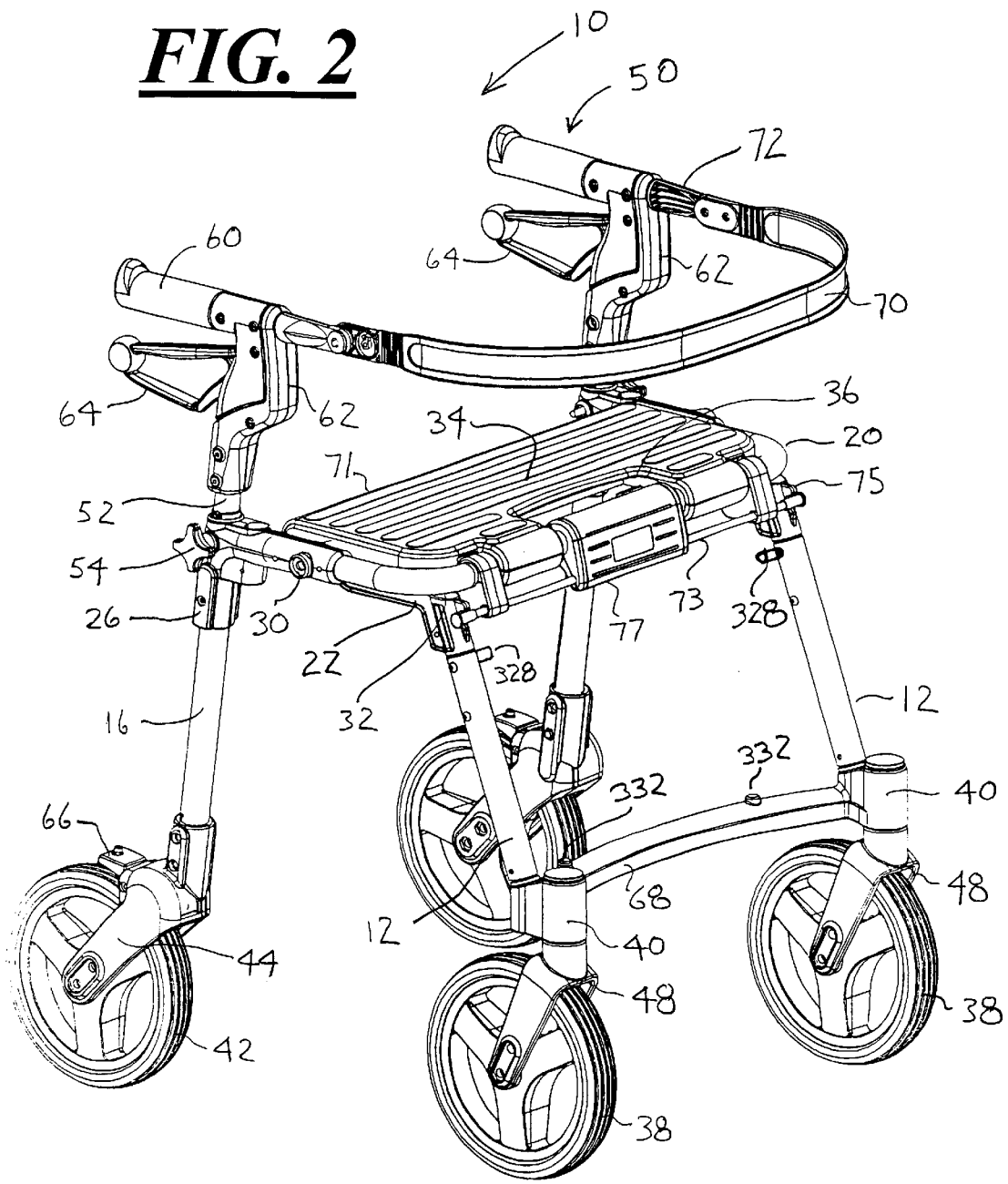
FIG. 2 is a front right perspective view of the walker/transport chair of the present invention shown with the carry basket removed.

Referring now to FIG. 2, pins 328 project inwardly from the upper ends of forward leg members 12. Pins 328 can each be a simple fixed boss or can comprise a cylindrical or wheel-like bearing member mounted for rotation about a horizontal axis. Posts 332 project upwardly from the left and right sides of cross bar 68.

Carry basket 300 is fitted to walker/transport chair 10 by placing it between forward leg members 12 with mounting notches 323 positioned over pins 328. Carry basket 300 can then be lowered such that pins 328 are received in grooves 316, and posts 332 contact the lower surface of slide members 324. In this position, the weight of carry basket 300 rests on pins 328 and posts 332.

Carry basket 300 can be moved between the forward projecting position shown in FIG. 7 and the retracted position shown in FIG. 3 by grasping it at a suitable location, preferably the upper edge of front panel 308 and sliding it in the forward or rearward direction. Carry basket 300 is maintained in the fully forward projecting position when detents 322 engage pins 328 and detents 326 engage posts 332. Carry basket 300 is maintained in the fully retracted position when detents 320 engage pins 328 and detents 325 engage posts 332.

Figure 8:
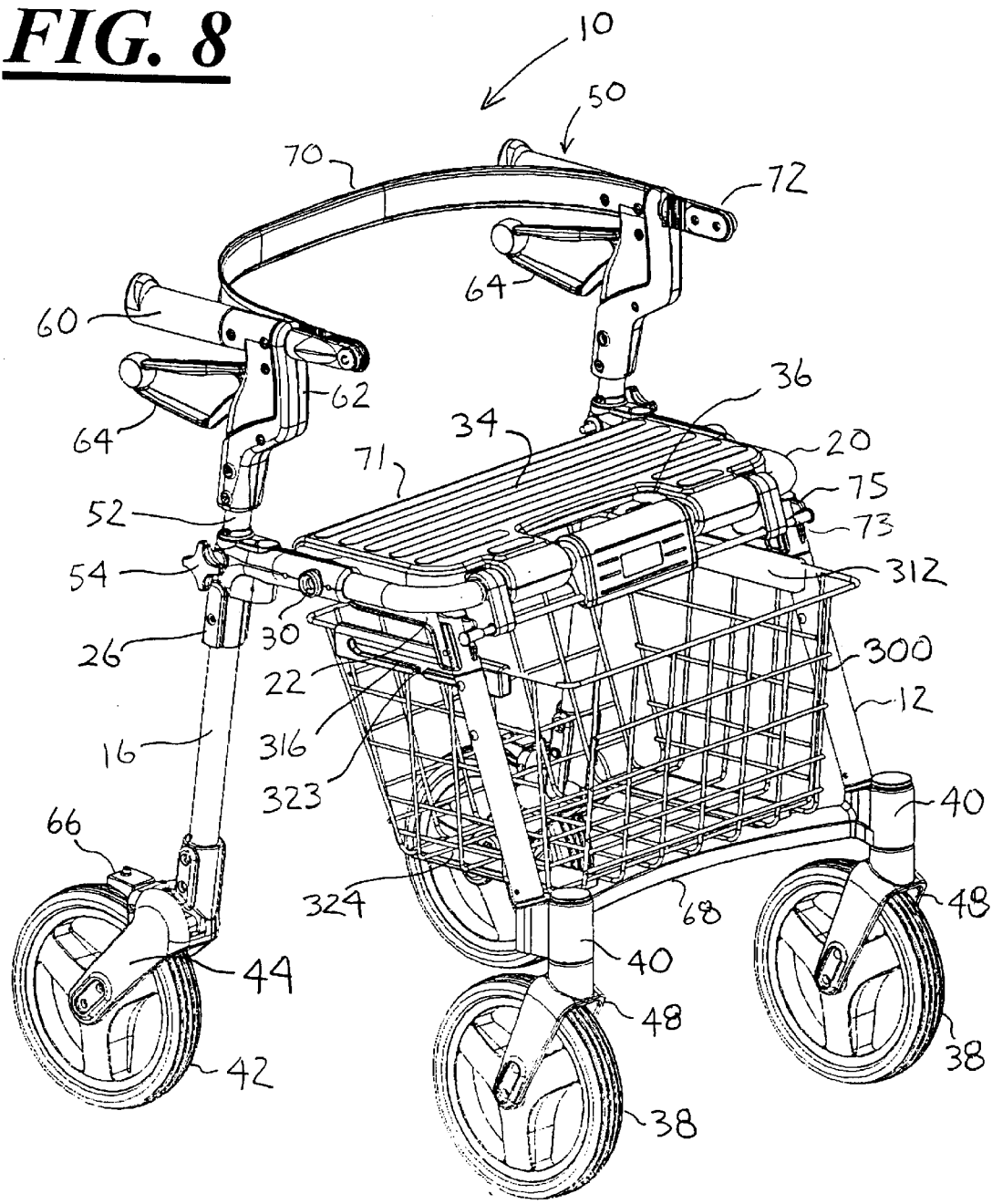
FIG. 8 is a front right perspective view of the walker/transport chair of the present invention with the back rest in the transport chair position and the carry basket in the retracted position.
Figure 9:
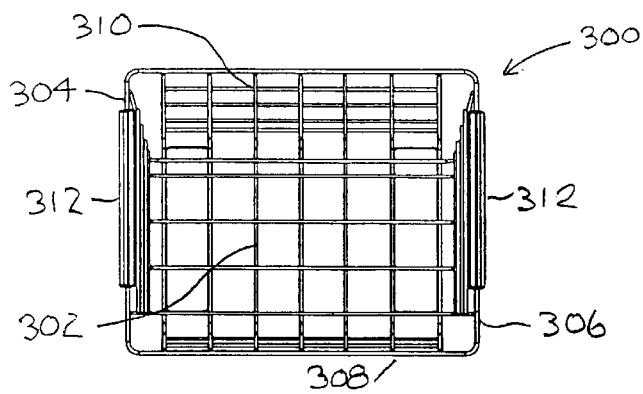
FIG. 9 is a plan view of the carry basket for use in the present invention.
Figure 10:
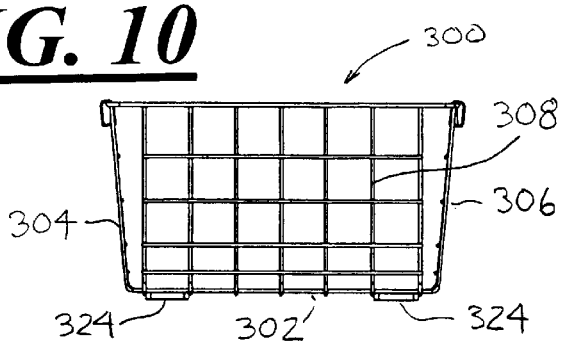
FIG. 10 is a front view of the carry basket for use in the present invention.
Figure 11:
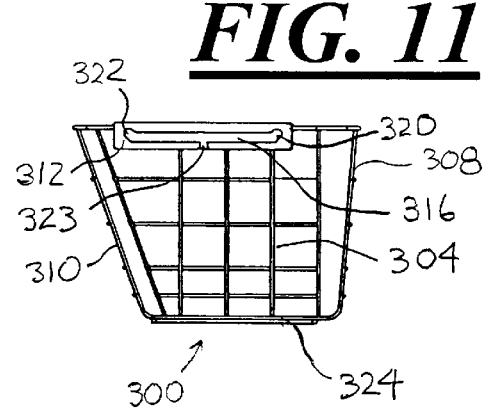
FIG. 11 is a right side view of the carry basket for use in the present invention.
Figure 12:
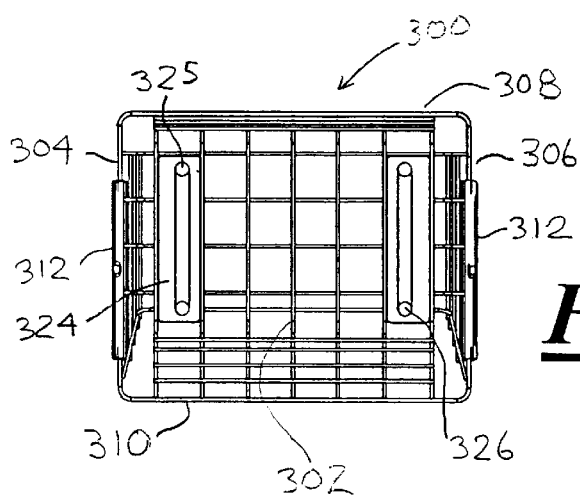
FIG. 12 is a bottom view of the carry basket for use in the present invention.

As shown in FIG. 7, when in the forward projecting position, the upper opening of carry basket 300 is accessible permitting easy loading by the user. When in the retracted position as shown in FIG. 3, carry basket 300 is substantially located beneath seating surface 34. This position provides important enhancement of manoeuvrability and stability, particularly when transporting heavy loads. In addition, when the walker/transport chair is used in the walker mode with the user standing behind the walker facing forward, the user can gain ready access to carry basket 300 by simply flipping up seating surface 34. Moreover, as shown in FIG. 8, the walker/transport chair of the present invention can be configured in the transport chair mode to accommodate a forward facing seated user. In such a mode, basket 300 may be placed into the retracted position so that it does not interfere with the user's legs.

If desired, carry basket 300 may be removed from walker/transport chair 10. This permits the basket to be loaded and unloaded at a point remote from walker/transport chair 10 or be used as a shopping basket. Carry basket 300 may be fitted with a carry handle (not shown) which can be pivotally connected to the central portion of rail members 312.

The frame design of walker 10 is particularly suitable for the sliding carry basket arrangement of the present invention. Carry baskets which are mounted to the front leg members of conventional walkers usually require upper and lower mounting points. The upper mounting points can conveniently be at some location near the top of the front leg members or on an upper cross bar extending between the upper ends of the front leg members. The lower mounting points can conveniently be at some location near the bottom of the front leg members or on the lower cross bar extending between the lower ends of the front leg members. These upper and lower mounting points are spaced longitudinally, due to the rake or the angle that the front leg members are displaced from the vertical. In conventional walker design, the substantial longitudinal separation of these mounting points makes it impractical to provide for a sliding carry basket arrangement.

The longitudinal separation of the upper and lower mounting points limits the length of travel of the longitudinal sliding motion that the carry basket can undergo. As described above, in the walker of the present invention, front leg members 12 are positioned at an angle closer to vertical than are most conventional walkers and cross bar 68 is curved rearward. This minimizes the longitudinal separation between pins 328 and posts 332. As a result, carry basket 300 can be nested substantially under seating surface 34 before detents 320 engage pins 328 and detents 325 engage posts 332. Similarly, carry basket 300 can be extended substantially forward of seating surface 34 before detents 322 engage pins 328 and detents 326 engage posts 332. The relatively close longitudinal spacing of pins 328 and posts 332 does not unduly restrict the available sliding stroke length and thereby permits a much larger basket to be effectively mounted for sliding movement than would otherwise be possible.

We claim:

1. A wheeled walker comprising a pair of front and a pair of rear leg members each having a wheel rotatably mounted at the lower end thereof, a horizontal seating surface transversely disposed at the upper ends of said front and rear leg members and a pair of handle bar members projecting upwardly and rearwardly of said seating surface, said walker further comprising:

a carry basket disposed between said front leg members, said carry basket comprising side panels each having a rail along its upper edge, said rail comprising an elongated track mounted on upper bearing surfaces projecting from said front leg members for reciprocal longitudinal movement between an extended position projecting forward of said front leg members and a retracted position substantially beneath said seating surface and for permitting said front and rear leg members to be folded toward one another to collapse said walker into a more compact configuration without removal of said carry basket.

2. The wheeled walker of claim 1 wherein said track has at least one detent position for maintaining said carry basket in at least one of said extended and retracted positions.

3. The wheeled walker of claim 1 further including a cross bar extending between the lower ends of said front leg members and wherein said carry basket is further mounted for movement between said first and second positions on a lower bearing surface on said cross bar.

4. The wheeled walker of claim 3 wherein said carry basket comprises a bottom panel having an elongated slide member for moving engagement over said lower bearing surface.

5. The wheeled walker of any one of claims 1 to 4 wherein said seating surface is mounted for upward pivotal movement about its forward edge thereby providing access to said carry basket when in said retracted position.

6. The wheeled walker of any one of claims 1 to 5 wherein said carry basket is removably mounted to said walker and includes a carry handle pivotally attached thereto.

7. The wheeled walker according to any one of claims 1 to 5 further including a backrest, said backrest being moveable between a first position adapted to support a rearward facing seated user's back and a second position adapted to support a forward facing seated user's back and wherein said carry basket when in said retracted position does not interfere with the user's legs when in said forward facing seated position.

8. The wheeled walker according to claim 4 further including a backrest, said backrest being moveable between a first position adapted to support a rearward facing seated user's back and a second position adapted to support a forward facing seated user's back and wherein said carry basket when in said retracted position does not interfere with the user's legs when in said forward facing seated position.

\* \* \* \* \*

UNITED STATES PATENT AND TRADEMARK OFFICE
CERTIFICATE OF CORRECTION

PATENT NO.    : 6,651,994 B1
DATED         : November 25, 2003
INVENTOR(S)   : Bjarki Hallgrimsson et al.

It is certified that error appears in the above-identified patent and that said Letters Patent is hereby corrected as shown below:

<u>Title page,</u>
Insert item:
-- [30]   Foreign Application Priority Data

Dec. 21, 2000  (CA)..............................2329485 --

Signed and Sealed this

Twentieth Day of April, 2004

JON W. DUDAS
*Acting Director of the United States Patent and Trademark Office*